United States Patent
Nishimiya

(10) Patent No.: US 11,541,510 B2
(45) Date of Patent: Jan. 3, 2023

(54) PALLET CLAMP

(71) Applicant: KITAGAWA IRONWORKS CO., LTD., Fuchu (JP)

(72) Inventor: Tamio Nishimiya, Fuchu (JP)

(73) Assignee: KITAGAWA IRONWORKS CO., LTD., Fuchu (JP)

( * ) Notice: Subject to any disclaimer, the term of this patent is extended or adjusted under 35 U.S.C. 154(b) by 18 days.

(21) Appl. No.: 17/422,435

(22) PCT Filed: Jan. 17, 2019

(86) PCT No.: PCT/JP2019/001198
§ 371 (c)(1),
(2) Date: Jul. 12, 2021

(87) PCT Pub. No.: WO2020/148847
PCT Pub. Date: Jul. 23, 2020

(65) Prior Publication Data
US 2022/0088749 A1 Mar. 24, 2022

(51) Int. Cl.
*B25B 5/02* (2006.01)
*B23Q 3/10* (2006.01)
*B23Q 1/00* (2006.01)

(52) U.S. Cl.
CPC .............. *B25B 5/02* (2013.01); *B23Q 1/0072* (2013.01); *B23Q 3/102* (2013.01)

(58) Field of Classification Search
CPC .. B25B 11/00; B23Q 3/00; B23Q 3/10; B23Q 3/102; B23Q 3/06; B23Q 3/067; B25H 1/08
See application file for complete search history.

(56) References Cited

U.S. PATENT DOCUMENTS

| | | | |
|---|---|---|---|
| 2007/0262507 A1 | 11/2007 | Bayer | |
| 2012/0321410 A1* | 12/2012 | Kitaura | B23Q 3/183 411/55 |
| 2014/0210150 A1* | 7/2014 | Bishop | B25B 5/103 269/101 |
| 2018/0229337 A1 | 8/2018 | Maurer et al. | |

FOREIGN PATENT DOCUMENTS

| | | |
|---|---|---|
| CN | 108422217 A | 8/2018 |
| JP | H06-9847 U | 2/1994 |
| JP | 2003-170329 A | 6/2003 |
| JP | 2005-81480 A | 3/2005 |
| JP | 6345375 B1 | 6/2018 |
| JP | 2019-022934 A1 | 2/2019 |

* cited by examiner

*Primary Examiner* — Tyrone V Hall, Jr.
*Assistant Examiner* — Alyssa R Williams
(74) *Attorney, Agent, or Firm* — Maschoff Brennan

(57) ABSTRACT

A pallet clamp includes a clamp receiver 110 and a clamp 130. The clamp receiver 110 has an abutted surface 111 with serrations, whereas the clamp 130 has an abutting surface 132 with serrations. The clamp receiver 110 has both of a pressed surface 180 and a counter pressed surface 181 which face in directions perpendicular to the direction along the extension of the serrations. A biasing means 150 press-fits the clamp receiver 110 and the clamp 130 to each other so that the abutting surface 132 and the abutted surface 111 come into tight contact with each other, which causes the pressed surface 180 and the counter pressed surface 181 to be pressed in opposite directions.

7 Claims, 11 Drawing Sheets

FIG.11
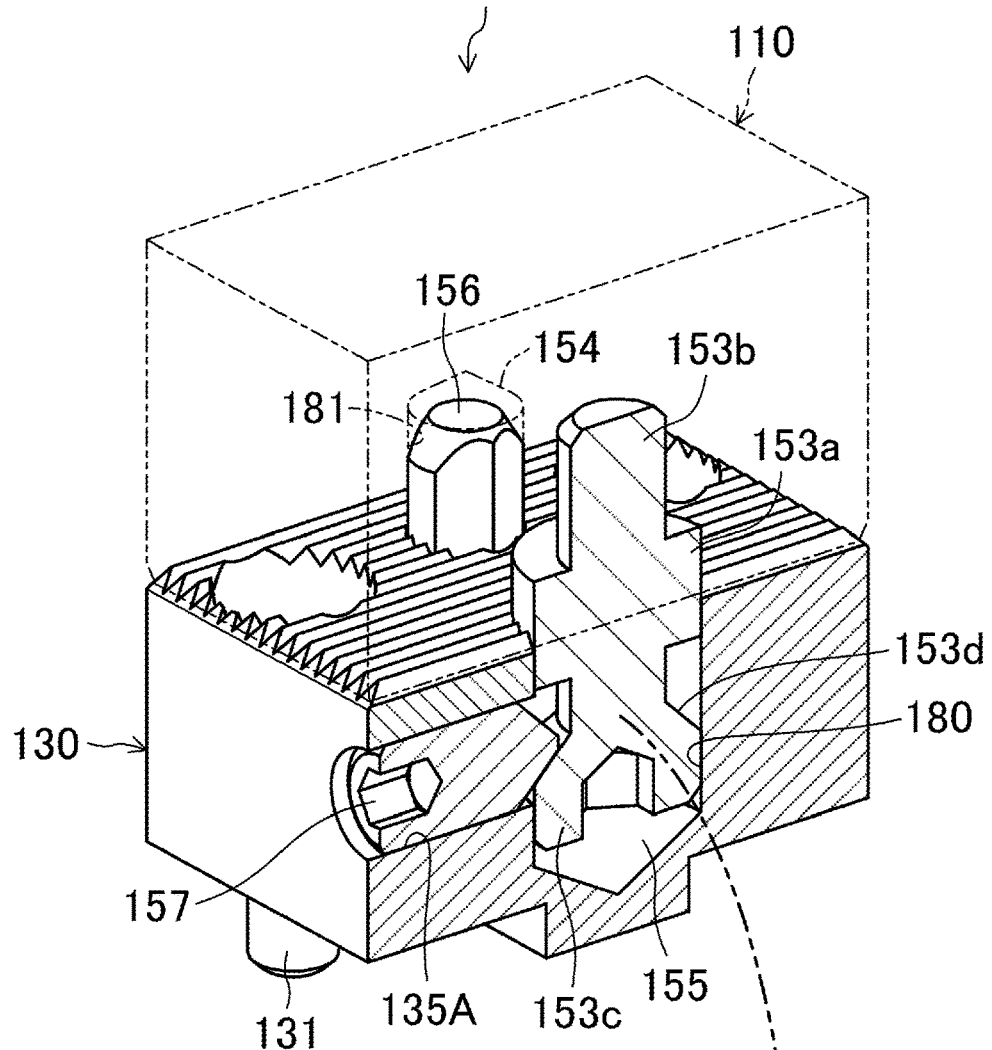
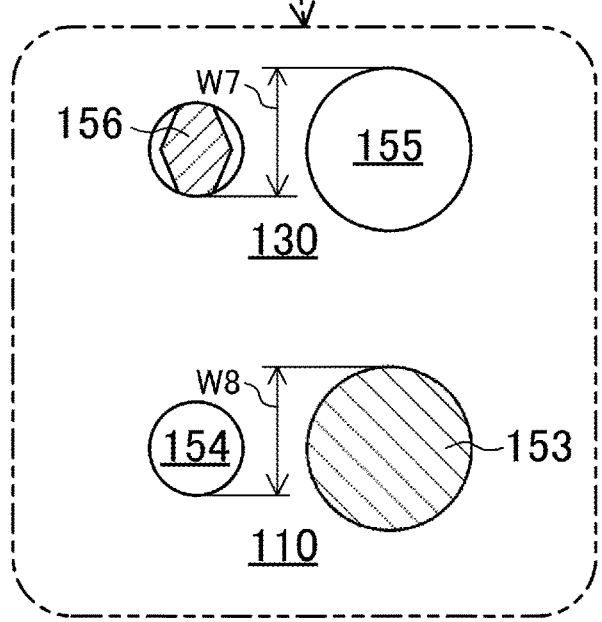

PALLET CLAMP

TECHNICAL FIELD

The present disclosure relates to a pallet clamp.

BACKGROUND ART

A pallet clamp is a device (a mechanism) that fixes a pallet to which a workpiece as a target for machining is to be mounted, with the pallet positioned on a table of a machine tool. Patent Documents 1 and 2 disclose typical pallet clamps.

Patent Document 1 discloses a pallet clamp that achieves positioning by inserting a plurality of positioning pins on a table into a plurality of positioning holes in a pallet.

Patent Document 2 discloses a pallet clamp that fixes a pallet to a table by pulling the pallet with collets. This pallet clamp includes, in a plurality of positions of the table, cylindrical piston pins each for housing a collet and having a tapered surface at its tip, i.e., having a smaller diameter toward the tip. The table includes, in the positions corresponding to the piston pins, receiving seats each having a pull stud and a surface around the pull stud for receiving the tapered surface.

At the time of clamping with the pallet clamp, the tapered surfaces are fitted to the respective receiving surfaces, thereby positioning the pallet on the table. Then, the collets grip and pull the pull studs toward the table to fix the pallet to the table.

CITATION LIST

Patent Documents

Patent Document 1: Japanese Unexamined Patent Publication No. 2003-170329
Patent Document 2: Japanese Unexamined Patent Publication No. 2005-81480

SUMMARY OF THE INVENTION

Technical Problems

The pallet clamp according to Patent Document 1 has a simple structure, but inevitably has fitting gaps between the positioning holes and the positioning pins, which causes a problem in the positioning accuracy.

On the other hand, the pallet clamp according to Patent Document 2 performs positioning by fitting the tapered surfaces into the receiving surfaces and thus seems, at first glance, to allow more accurate positioning than the pallet clamp according to Patent Document 1.

However, the tapered portions of the pallet clamp according to Patent Document 2 have a sliding structure which inevitably has gaps at slide guides. The pallet clamp according to Patent Document 2, too, has a problem in the positioning accuracy.

In addition, in the case of the pallet clamp according to Patent Document 2, there is a need to secure a large space between the table and the pallet due to the structure. However, since the space above the table is a work area for machining workpieces, there is a demand for lowering the position of the pallet to secure a wider work area. The pallet clamp according to Patent Document 2 has an acute problem of the narrower work area.

To address such problems, the inventor of the present disclosure has focused on a chuck, how which is used is completely different (i.e., a device for fixing workpieces that are machined while the workpieces are rotated at a high speed). After continuous intensive studies, the inventor of the present disclosure has found that an excellent pallet clamp which can solve these problems can be achieved by applying, to a pallet clamp, a technique that allows a top jaw to be attached to the chuck with highly accuracy repeatability.

Specifically, it is an objective of the present disclosure to provide a pallet clamp that allows highly accurate positioning and firm fixing with a simple and compact structure that allows lowering of the position of a pallet.

Solution to the Problems

The present disclosure relates to a pallet clamp for fixing a pallet to a table, with the pallet positioned on the table.

The pallet clamp includes: a clamp receiver on a back surface of the pallet; a clamp on a mounting surface of the table, the clamp facing the clamp receiver; and a press-fitted portion at which the clamp receiver and the clamp are press-fitted to each other in a direction perpendicular to the mounting surface by a biasing means. The clamp receiver has, at the press-fitted portion, an abutted surface having serrations. The clamp has, at the press-fitted portion, an abutting surface having serrations, the abutting surface coming into tight contact with the abutted surface. One of the clamp receiver or the clamp has both of a pressed surface and a counter pressed surface which face in directions along alignment and extension of ridges and grooves of the serrations, or each of the clamp receiver and the clamp independently has the pressed surface and the counter pressed surface. The biasing means press-fits the clamp receiver and the clamp to each other so that the abutting surface and the abutted surface come into tight contact with each other, which causes the pressed surface and the counter pressed surface to be pressed in opposite directions.

In one preferred embodiment, the pallet clamp further includes: a key member interposed between the clamp receiver and the clamp, wherein the clamp receiver has a keyway in the abutted surface, the keyway traversing the serrations, the clamp has a support groove in the abutting surface, the support groove traversing the serrations and facing the keyway, the key member includes a key to be fitted into the keyway, and a support to be fitted into the support groove, the support is fitted into the support groove to be in an unremovable state, and the key is fitted into the keyway with a gap interposed therebetween, and the abutting surface and the abutted surface that have come into tight contact with each other cause the key to press the pressed surface and the counter pressed surface.

In one preferred embodiment, the keyway tilts with respect to the key when the key is fitted to, but not press-fitted to, the keyway.

In one preferred embodiment, the key member includes two key members for use in the pallet clamp, and one of the key members presses the pressed surface, and the other of the key members presses the counter pressed surface.

In one preferred embodiment, one of the clamp receiver or the clamp includes a pair of regulators each independently having the pressed surface and the counter pressed surface, the pair of regulators being spaced apart from each other in the direction along the alignment of the ridges and grooves of the serrations, and the abutting surface and the abutted surface that have come into tight contact with each other cause the clamp receiver and the clamp to tilt relatively, and the other of the clamp receiver or the clamp to press the pressed surface and the counter pressed surface.

In one preferred embodiment, one of the abutted surface or the abutting surface includes: a press-fitting shaft having, on one side, an engagement surface that is inclined; and a pin hole positioned away from the press-fitting shaft, the other of the abutted surface or the abutting surface includes: a shaft hole configured to face the press-fitting shaft; and a regulation pin configured to face the pin hole, the shaft hole is configured to allow a pull-in shaft to protrude laterally into the shaft hole, the pull-in shaft having a protruding end to be engaged with the engagement surface, and the pull-in shaft is caused to protrude into the shaft hole, with the regulation pin inserted in the pin hole, the press-fitting shaft inserted in the shaft hole, and the abutting surface and the abutted surface in contact with each other, and the pull-in shaft protruding into the shaft hole draws the press-fitting shaft into the shaft hole and causes the abutting surface and the abutted surface to come into tight contact with each other, and causes the press-fitting shaft to press a wall surface of the shaft hole and the regulation pin to press a wall surface of the pin hole in a direction opposite to a direction in which the press-fitting shaft presses the wall surface of the shaft hole.

Advantages of the Invention

A pallet clamp employing the technology disclosed herein allows highly accurate positioning and firm fixing of a pallet and provides a wider area for machining workpieces.

BRIEF DESCRIPTION OF THE DRAWINGS

FIG. 11 is a diagram illustrating a schematic perspective view of a part of the pallet clamp (according to the fifth embodiment) in cross section.

DESCRIPTION OF EMBODIMENTS

Embodiments of the present disclosure will now be described in detail with reference to the drawings. Note that the following description of the embodiments is merely an example in nature, and is not intended to limit the scope, applications, or use of the present invention.

—Overall Structure of Pallet Clamp—

Figure 1:
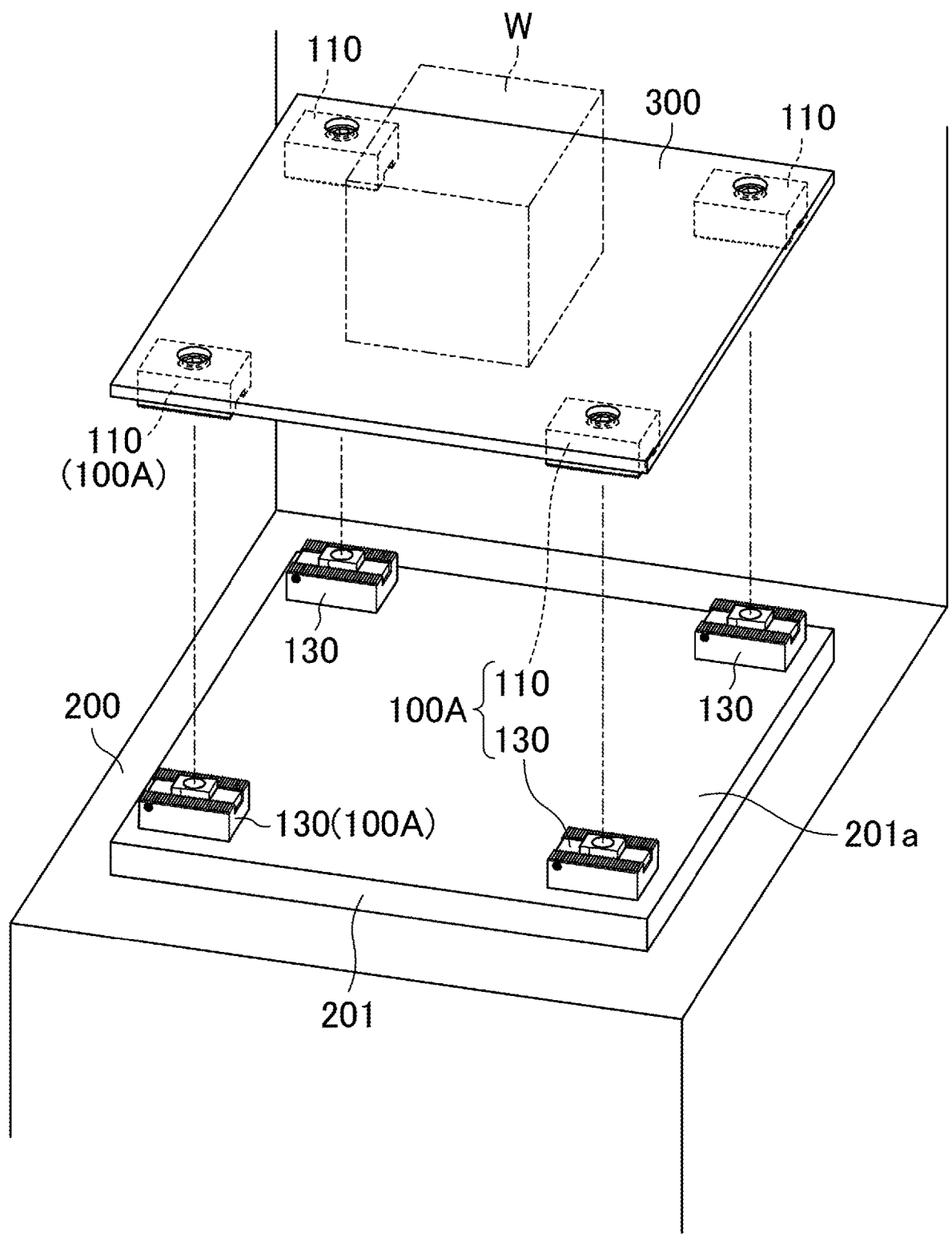
FIG. 1 is a diagram illustrating a schematic perspective view of a pallet clamp (according to a first embodiment) in an example use state.

FIG. 1 illustrates pallet clamps 100A each employing the technology disclosed herein. The pallet clamps 100A are used for a machine tool 200 (e.g., a machining center).

The machine tool 200 has a table 201 extending substantially horizontally, and the space above the table 201 is a work area for machining Before machining, a plate-like pallet 300 to which a workpiece W is attached is placed on the table 201.

In order to fix the pallet 300 while being positioned on the table 201 with high accuracy, the pallet clamps 100A are provided between the pallet 300 and the table 201. The number and arrangement of the pallet clamps 100A may be selected as appropriate in accordance with the size and shape of the pallet 300. For example, if the pallet 300 is small, one pallet clamp 100A suffices. In this embodiment, four pallet clamps 100A are located at four separate positions on the table 201.

The pallet clamp 100A disclosed herein has a more simple and compact structure than typical pallet clamps. Costs for materials are therefore low. In addition, the pallet 300 can be placed lower in position, compared to conventional pallet clamps. Moreover, the pallet 300 can be positioned highly accurately and fixed firmly with a simple operation.

Specifically, each pallet clamp 100A employs "serrations (i.e., a meshing structure with saw teeth)" for use in a chuck positioning mechanism.

—Individual Structure of Pallet Clamp 100A—

First Embodiment

Figure 2:
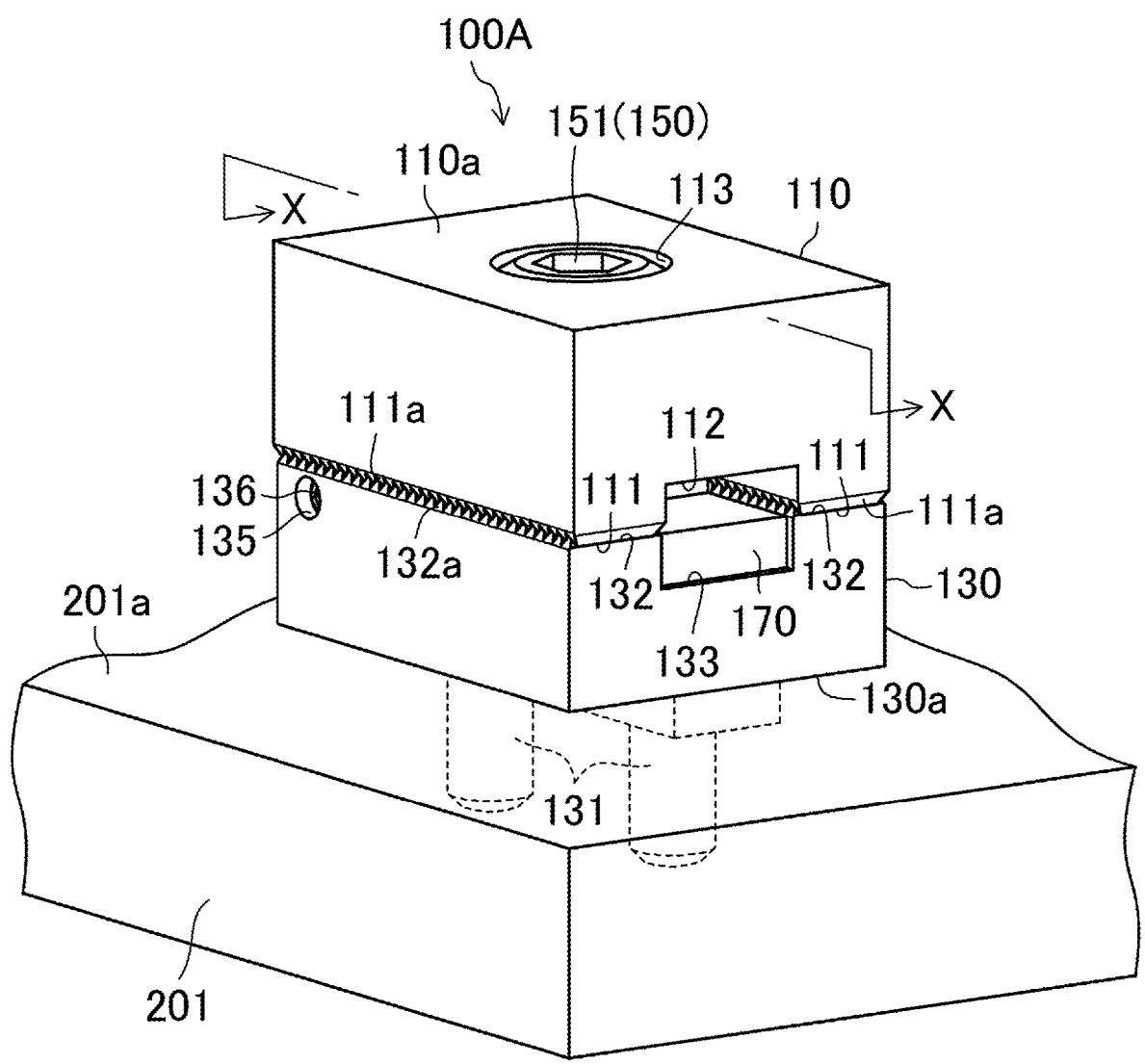
FIG. 2 is a diagram illustrating a schematic perspective view of the pallet clamp (according to the first embodiment).
Figure 3:
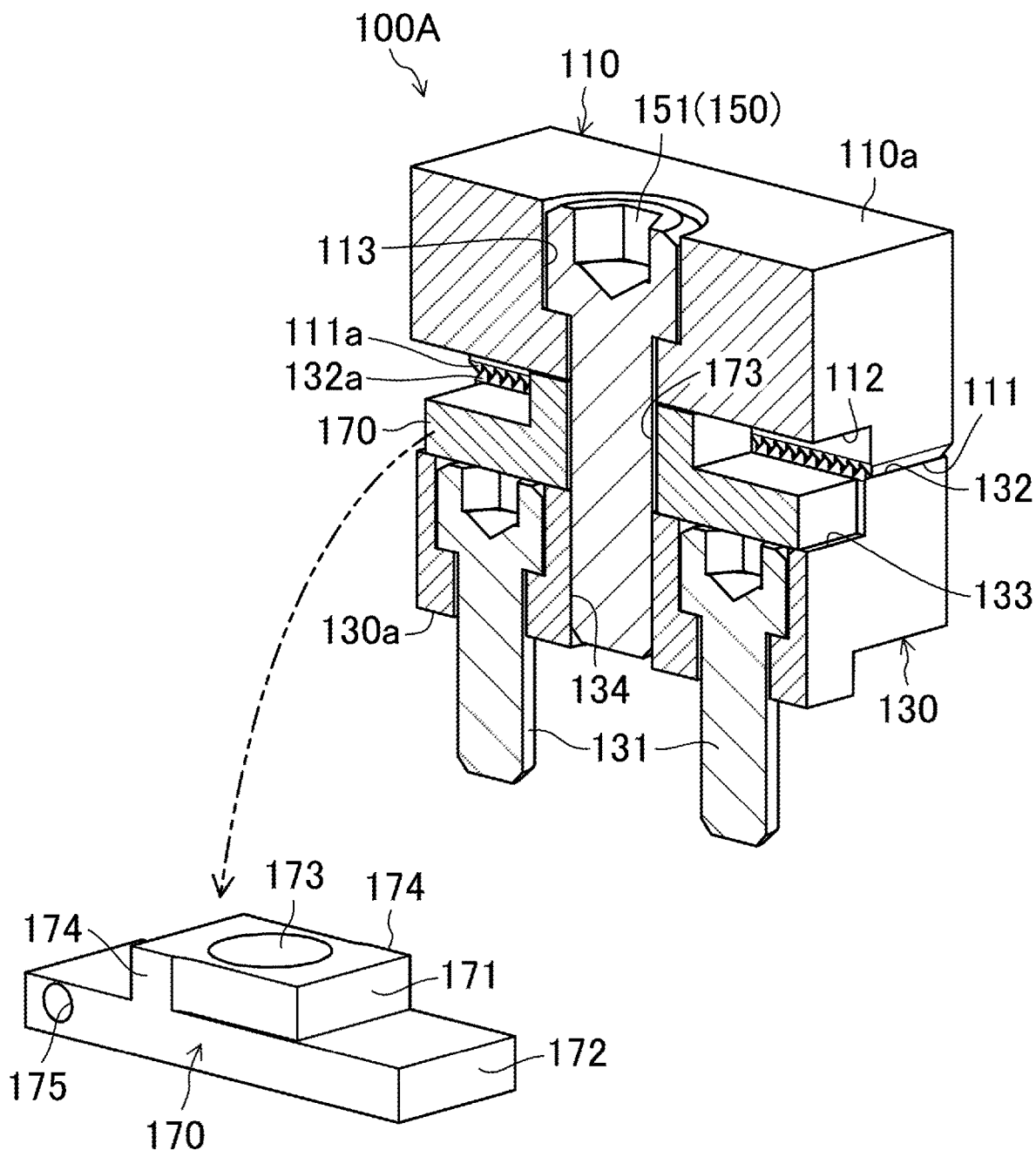
FIG. 3 is a diagram illustrating a schematic perspective view of a cross section (taken along the arrow X-X in FIG. 2) of the pallet clamp (according to the first embodiment) and an outer shape of a key member.

FIG. 2 is an enlarged view of one of the pallet clamps 100A. FIG. 3 is a cross-sectional view of the pallet clamp 100A.

The pallet clamp 100A includes, as its basic configuration, a clamp receiver 110, a clamp 130, and a biasing means 150. The clamp receiver 110 is provided on the back surface of the pallet 300. The clamp 130 is provided on a mounting surface 201a of the table 201. The biasing means 150 press-fits the clamp receiver 110 and the clamp 130 to each other in a direction perpendicular to the mounting surface 201a. The pallet clamp 100A according to this embodiment further includes a key member 170. The key member 170 is interposed between the clamp receiver 110 and the clamp 130.

(Clamp Receiver 110)

The clamp receiver 110 is made of a thick rectangular plate-like (rectangular parallelepiped) metal mass. The clamp receiver 110 has two plate surfaces, one of which (i.e., an attachment surface 110a) is fixed to the back surface of the pallet 300. Accordingly, the other plate surface of the clamp receiver 110 facing downward of the pallet 300 constitutes a press-fitted portion to be press-fitted to the clamp 130. The press-fitted portion has an abutted surface 111 with serrations 111a.

Specifically, the serrations 111a have a known meshing structure with saw teeth. The serrations 111a include a group of linear ridges and grooves having a transverse sectional shape comprised of peaks and bottoms of successively-arranged substantial triangles. The abutted surface 111 has such a transverse sectional shape of the serrations 111a along the width direction (i.e., along the shorter sides) of the abutted surface 111. The direction in which each serration extends widthwise will be hereinafter also referred to as a "direction along the extension of each serration."

The abutted surface 111 has, in a central portion in the width direction, a keyway 112 to traverse the serrations 111a. The keyway 112 is a groove with a rectangular transverse section. The keyway 112 extends in the length direction (i.e., along the long sides) of the abutted surface 111 and penetrates the clamp receiver 110 from one end to the other. Accordingly, the abutted surface 111 is divided into two by the keyway 112. The keyway 112 has, on both sides, a pair of band-like areas with the serrations 111a.

Specifically, the keyway 112 extends in a direction along the alignment of the ridges and grooves of the serrations 111a. The keyway 112 has, in a substantially central portion thereof (i.e., a substantially central portion of the clamp receiver 110), a bolt hole 113 passing to the attachment surface 110a.

(Clamp 130)

Clamps 130 are placed at respective positions on the table 201 so as to face the associated clamp receivers 110 placed at the respective positions on the pallet 300.

Each clamp 130 is also made of a thick rectangular plate-like metal mass. The clamp 130 has two plate surfaces, one of which (i.e., an attachment surface 130a) is fixed to the mounting surface 201a of the table 201. Specifically, the clamp 130 is fastened to the table 201 with bolts 131 (two bolts in this embodiment). The other plate surface of the clamp 130 facing upward of the table 201 constitutes the press-fitted portion to be press-fitted to the clamp receiver 110. The press-fitted portion has an abutting surface 132 with serrations 132a.

Specifically, the abutting surface 132 has the serrations 132a that are in tight contact with the abutted surface 111 and extend in the width direction (i.e., along the shorter sides) of the abutting surface 132.

The abutting surface 132 has, in a central portion in the width direction, a support groove 133 to traverse the serrations 132a. The support groove 133 has a rectangular transverse section. The support groove 133 extends in the length direction (i.e., along the long sides) of the abutting surface 132 and penetrates the clamp 130 from one end to the other. Accordingly, the abutting surface 132 is divided into two by the support groove 133. The support groove 133 has, on both sides, a pair of band-like areas with the serrations 132a.

Specifically, like the keyway 112, the support groove 133 extends in a direction along the alignment of the ridges and grooves of the serrations 132a. Accordingly, the support groove 133 is configured to face and overlap the keyway 112 when the abutting surface 132 comes into tight contact with the abutted surface 111. The support groove 133 has, in a substantially central portion thereof, a fastening hole 134 (which has a female screw, the same applies hereinafter) passing to the attachment surface 130a.

Figure 4:
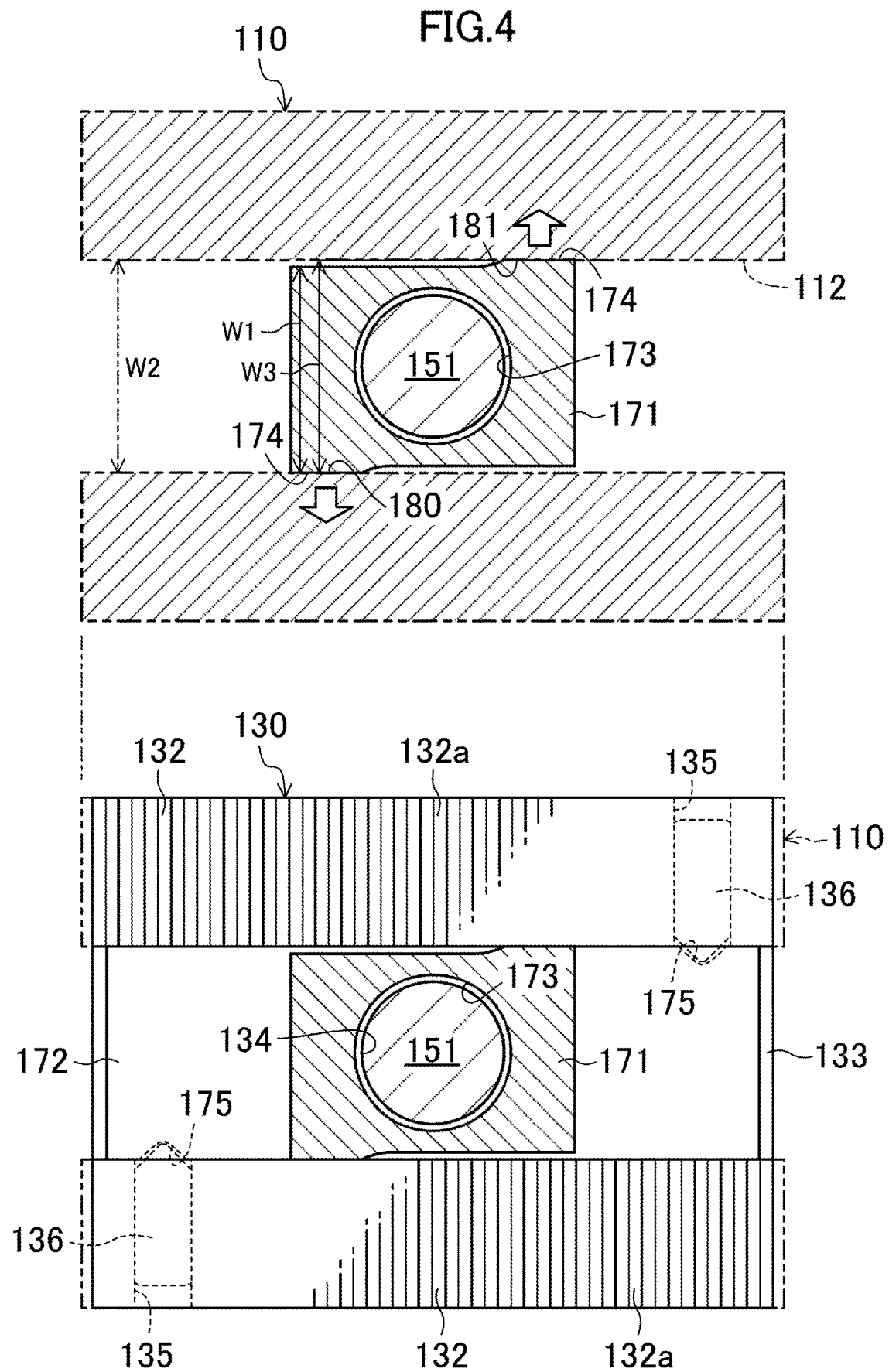
FIG. 4 is a diagram for explaining the positioning and fixing functions of the pallet clamp (according the first embodiment).

As shown in FIG. 4, each clamp 130 has, in each side surface, a transverse screw hole 135 passing to one of the side surfaces of the support groove 133. The transverse screw holes 135 are arranged in separate positions at the respective ends of the support groove 133. Each transverse screw hole 135 receives a key stop bolt 136 with a conical tip screwed thereinto. The tips of the key stop bolts 136 protrude into the support groove 133.

(Key Member 170)

The key member 170 is a metal plate member with a long side. The key member 170 includes a thick plate-like key 171 and a thick plate-like support 172 longer than the key 171. The key 171 is integral with the support 172 so as to be stacked on a substantially central portion of the support 172 in the longitudinal direction. The key 171 has a portion with a smaller width and a portion with a greater width than the width of the keyway 112. The support 172 has a slightly smaller width than the support groove 133. The key member 170 has, at the substantial center thereof, an insertion hole 173 penetrating the key 171 and the support 172 in the thickness direction.

The key 171 has, at diagonally opposite corners on the side surfaces thereof, a pair of acting portions 174 and 174 obtained by cutting off part of the side surfaces with a certain thickness and thus protruding relatively slightly.

Specifically, as shown in FIG. 4, the width W1 of each end portion of the key 171 including one of the acting portions 174 is formed smaller than the width W2 of the keyway 112, and the maximum width W3 of the key 171 including both the acting portions 174 is formed slightly greater than the width W2 of the keyway 112 (i.e., W1<W2<W3). As a result, the key 171 cannot be inserted in the keyway 112 unless the key 171 is tilted with respect to the keyway 112, but can be inserted if the key 171 is tilted (not shown as it is a slight tilt).

The support 172 has, at diagonally opposite corners on the side surfaces thereof (i.e., corresponding to the diagonally opposite corners of the key 171 where the acting portions 174 are formed), a pair of conical recesses 175 and 175 into which the tips of the key stop bolts 136 are fitted.

As shown in FIG. 4, the support 172 is fitted into the support groove 133 by the pair of key stop bolts 136 and 136 to be in an unremovable state. In this state, the insertion hole 173 overlaps the fastening hole 134.

(Attachment of Pallet Clamp 100A)

An operation of attaching the pallet 300 to the table 201 using the pallet clamps 100A will be described. First, the pallet 300 is placed so that each of the clamp receivers 110 overlaps an associated one of the clamps 130 arranged on the table 201.

Accordingly, the abutted surface 111 comes into contact with the abutting surface 132, with the serrations 111a and 132a loosely meshing with each other. The key 171 enters the keyway 112. At this time, the key 171 is fitted into the keyway 112 with a gap left therebetween in the width direction. The bolt hole 113 overlaps the insertion hole 173 and the fastening hole 134.

The fastening bolt 151 is inserted into the bolt hole 113 and the insertion hole 173 overlapping each other, and screwed into the fastening hole 134. Accordingly, the clamp receiver 110 and the clamp 130 are press-fitted together in the direction perpendicular to the mounting surface 201a. That is, in each of the pallet clamps 100A, the fastening bolt 151 constitutes the biasing means 150.

As the press-fitting by the fastening bolt 151 progresses, the serrations 111a and 132a are firmly engaged with each other, and the abutted surface 111 and the abutting surface 132 come into tight contact with each other. Accordingly, the clamp receiver 110 is positioned highly accurately and fixed firmly to the clamp 130 in the direction along the alignment of the ridges and grooves of the serrations 111a (132a) (i.e., the longitudinal direction of the abutted surface 111).

The clamp receiver 110 becomes parallel to the clamp 130 so that the center lines of the clamp receiver 110 and the clamp 130 in the width direction agree with each other. At this time, as described above, the key 171 constitutes a positioning mechanism. Accordingly, when the abutting surface 132 and the abutted surface 111 are in tight contact with each other, the acting portions 174 of the key 171 act as follows, as indicated by the white arrows in FIG. 4: one of the acting portions 174 of the key 171 comes into contact with, and presses, one of the side surfaces of the keyway 112; and the other acting portion 174 of the key 171 comes into contact with, and presses, the other side surface of the keyway 112.

That is, one of the acting portions 174 of the key 171 presses one of the side surfaces of the keyway 112 outward. The other acting portion 174 of the key 171 presses the other side surface of the keyway 112 outward. The key 171 fixed to the clamp 130 via the support 172 presses the clamp receiver 110 in opposite directions from the inside via both of the side surfaces of the keyway 112. Accordingly, the clamp receiver 110 is positioned highly accurately and fixed firmly also in the direction along the extension of each serration 111a (i.e., the width direction of the abutted surface 111).

In each of these pallet clamps 100A, as will be described later, one of the side surfaces of the keyway 112 corresponds to a pressed surface 180, and the other side surface corresponds to a counter pressed surface 181.

Second Embodiment

Figure 5:
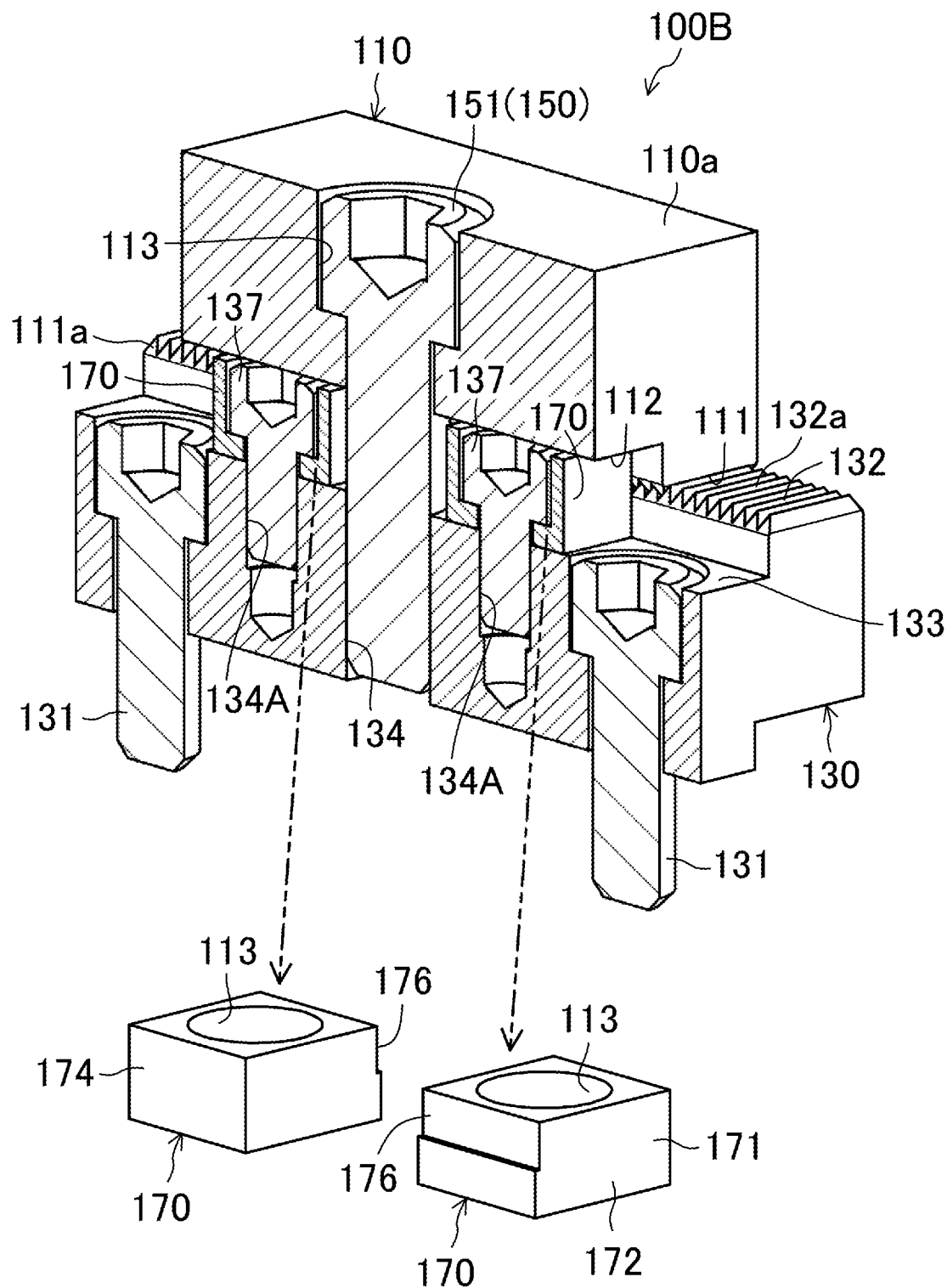
FIG. 5 is a diagram illustrating a schematic perspective view of a cross section of a pallet clamp (according to a second embodiment) and outer shapes of key members.

FIG. 5 is a cross-sectional view of a pallet clamp 100B according to this embodiment. The pallet clamp 100B has the same basic configuration as the pallet clamp 100A described above. The same reference numerals are thus used to represent members with the same structures or functions, and the description thereof will be omitted. Only the differences will be described (the same applies to other embodiments).

According to this pallet clamp 100B, two key members 170 are used for each pallet clamp 100B. One of the key members 170 presses the pressed surface 180, and the other key member 170 presses the counter pressed surface 181.

The key members 170 are identical members, each in a rectangular parallelepiped shape with the vertical width and the horizontal width thereof substantially equal to the width of the support groove 133. The key 171 of this key member 170 has one side surface (i.e., a non-acting portion 176) partially cut off with a certain thickness and thus closer to the center in the width direction of the key 171 than the other side surface (i.e., an acting portion 174). Accordingly, when the key 171 is fitted into the keyway 112, a gap is left between the key 171 and the side surface of the keyway 112.

The key member 170 has, at the substantial center thereof, a bolt hole 113 penetrating the key 171 and the support 172 in the thickness direction. On both sides of the fastening hole 134 in the support groove 133 of each clamp 130, second fastening holes 134A are formed symmetrically. The key members 170 are fixed to the clamp 130 with bolts 137 fastened into the second fastening holes 134A, with the acting portions 174 and the non-acting portion 176 of the respective key members 170 facing opposite with respect to the side surfaces of the keyway 112.

Attachment of Pallet Clamp 100B

Like in the first embodiment, the fastening bolt 151 is inserted into the bolt hole 113 and the fastening hole 134 overlapping each other. As the press-fitting by the fastening bolt 151 progresses, the abutted surface 111 and the abutting surface 132 come into tight contact with each other. Accordingly, the clamp receiver 110 is positioned highly accurately and fixed firmly to the clamp 130 in the direction along the alignment of the ridges and grooves of the serrations 111a.

Figure 6:
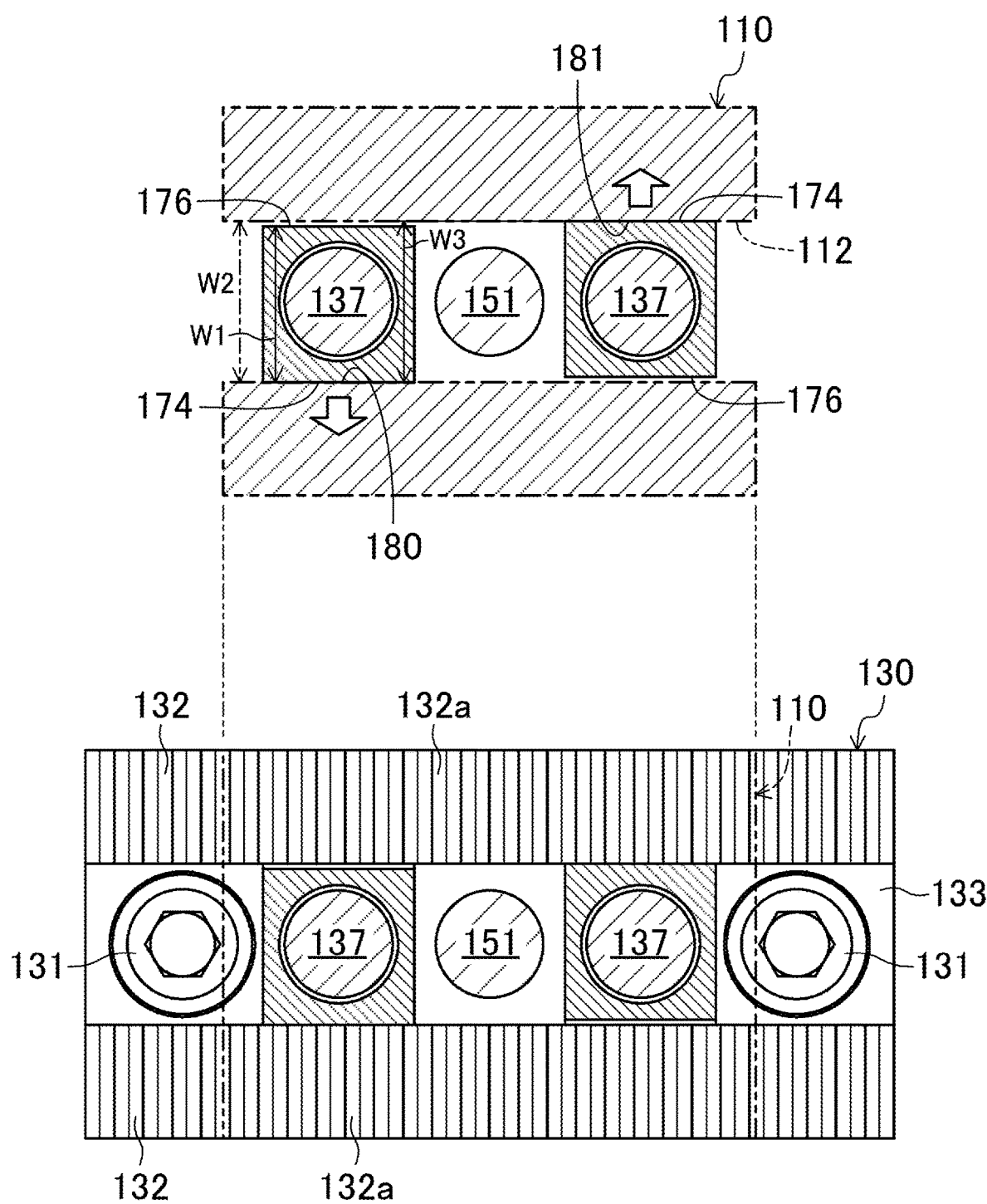
FIG. 6 is a diagram illustrating the positioning and fixing functions of the pallet clamp (according the second embodiment).

Except for the point that the two key members 170 are provided, the arrangement and dimensional relationship are the same as those of the key 171 (see W1, W2, and W3 in FIG. 6). That is, as indicated by the white arrows in FIG. 6, the acting portion 174 of one of the key members 170 comes into contact with, and presses, one of side surfaces of the keyway 112. The acting portion 174 of the other key member 170 comes into contact with, and presses, the other side surface of the keyway 112.

Accordingly, the clamp receiver 110 is positioned highly accurately and fixed firmly also in the direction along the extension of each serration 111a. In each of these pallet clamps 100B, like in the first embodiment, one of the side surfaces of the keyway 112 corresponds to the pressed surface 180, and the other side surface corresponds to the counter pressed surface 181.

In this pallet clamp 100B, the key members 170 are small in size and simple in configuration, which makes it possible to use two of such key members 170 together and achieve the pallet clamp 100B more simply and inexpensively than in the first embodiment. In addition, the distance between the pressed surface 180 and the counter pressed surface 181 can be longer than in the first embodiment, the clamp receiver 110 can be positioned with higher accuracy and fixed more firmly.

Third Embodiment

Figure 7:
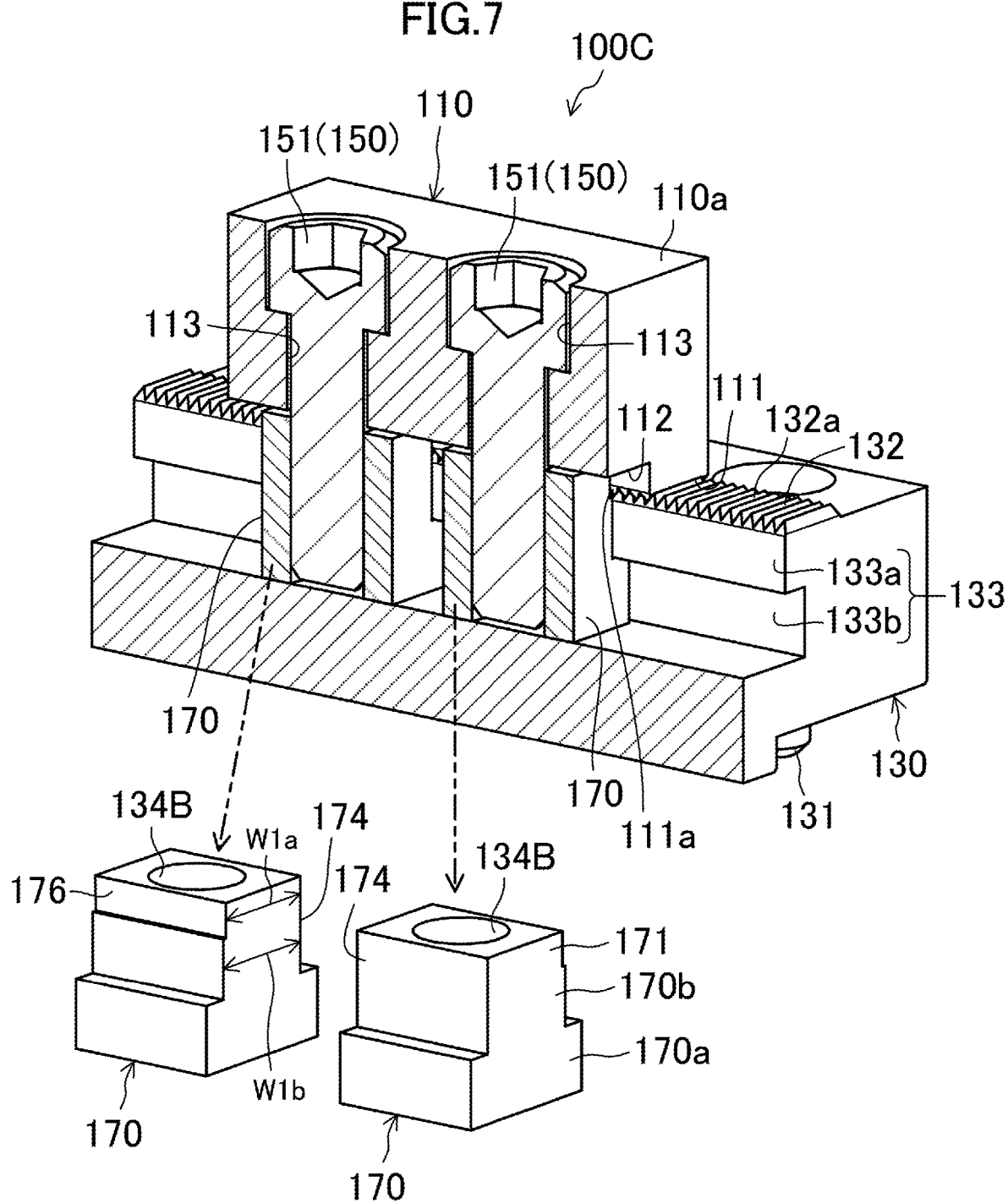
FIG. 7 is a diagram illustrating a schematic perspective view of a cross section of a pallet clamp (according to a third embodiment) and outer shapes of key members.

FIG. 7 is a cross-sectional view of a pallet clamp 100C according to this embodiment. This pallet clamp 100C is obtained by applying a chuck structure to the pallet clamp 100B according to the second embodiment to improve the flexibility in arranging the key members 170.

Specifically, the clamp receiver 110 has, at separate positions in the longitudinal direction of the keyway 112, two bolt holes 113 and 113 formed symmetrically and passing from the keyway 112 to the attachment surface 110a. The support groove 133 has a substantially inverted T-shaped transverse section. Specifically, the support groove 133 includes a narrower portion 133a having a relatively narrow width and open to the abutting surface 132, and a wider portion 133b having a relatively wide width and continuous with the narrower portion 133a.

Each key member 170 has a substantially T-shaped transverse section. Each key member 170 has a stopper 170a, an intermediate step 170a, and a key 171. The stopper 170a is slidably fitted in the wider portion 133b. The intermediate step 170a is fitted in the narrower portion 133a with a gap left therebetween. The key 171 is fitted into the keyway 112 with a gap left therebetween. The key 171 has two side surfaces, one of which (i.e., a non-acting portion 176) is closer to the center than the other (i.e., an acting portion 174). When the key 171 is fitted into the keyway 112, a gap is left between the key 171 and the one side surface of the keyway 112. These points are the same as in the second embodiment.

Each key member 170 has, at the substantial center thereof, a third fastening hole 134B penetrating the key 171 and the support 172 in the thickness direction.

(Attachment of Pallet Clamp 100C)

In this pallet clamp 100C, the key members 170 are inserted into the support groove 133, with the acting portions 174 and the non-acting portions 176 of the respective key members 170 facing opposite with respect to the side surfaces of the keyway 112. Accordingly, the key members 170 are positioned so that the two bolt holes 113 of the clamp receiver 110 overlap the third fastening holes 134B. Two fastening bolts 151 inserted into the respective bolt holes 113 are screwed into the respective third fastening holes 134B.

As the press-fitting by these fastening bolts 151 progresses, the abutted surface 111 and the abutting surface 132 come into tight contact with each other. Accordingly, the clamp receiver 110 is positioned highly accurately and fixed firmly to the clamp 130 in the direction along the alignment of the ridges and grooves of the serrations 111a.

Figure 8:
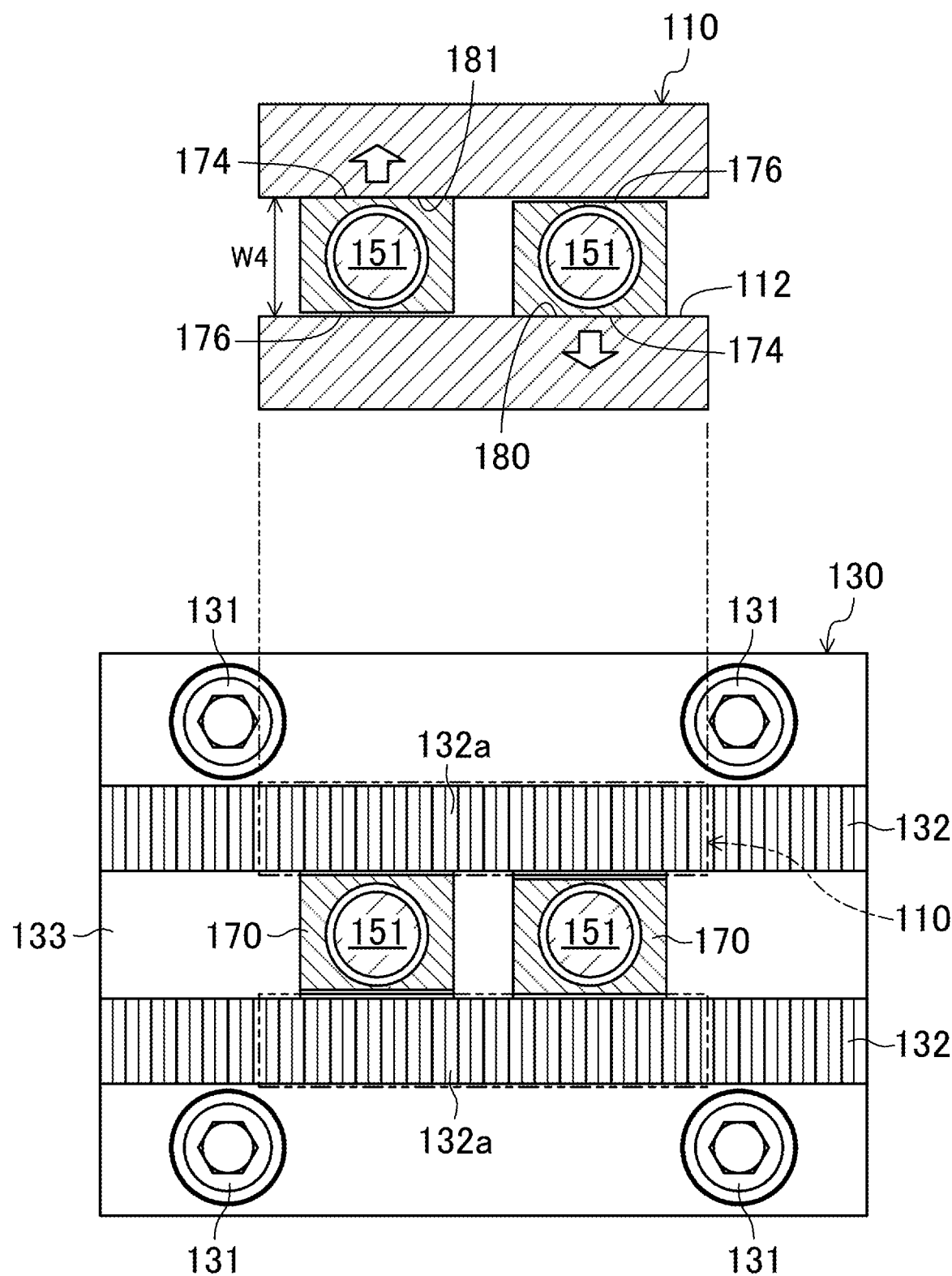
FIG. 8 is a diagram illustrating the positioning and fixing functions of the pallet clamp (according the third embodiment).

As shown in FIGS. 7 and 8, in each of these key members 170, the width W4 of the keyway 112 is greater than the width W1a of the key 171, and the width W1b of the intermediate step 170b is slightly greater than the width W4 of the keyway 112 (i.e., W1a<W4<W1b). That is, as indicated by the white arrows in FIG. 8, like in the second embodiment, the acting portion 174 of one of the key members 170 comes into contact with, and presses, one of side surfaces of the keyway 112. The acting portion 174 of the other key member 170 comes into contact with, and presses, the other side surface of the keyway 112. Accordingly, the clamp receiver 110 is positioned highly accurately and fixed firmly also in the direction along the extension of each serration 111a.

In this pallet clamp 100B, like in the second embodiment, the key members 170 are small in size and simple in configuration, which makes it possible to use two of such key members 170 together. Since the key members 170 are movable in accordance with the positions of the bolt holes 113, the flexibility in arranging the key members 170 improves.

Fourth Embodiment

Figure 9:
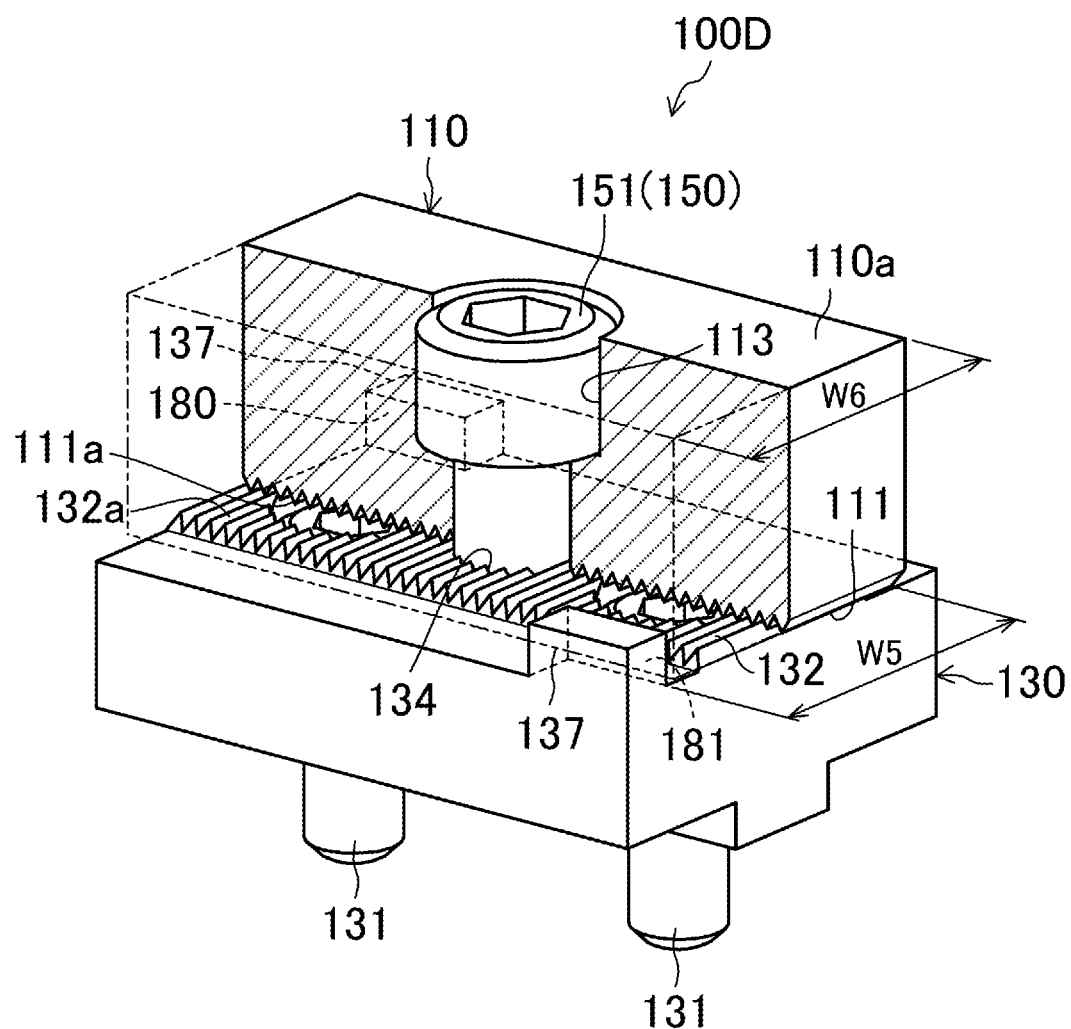
FIG. 9 is a diagram illustrating a schematic perspective view of a part of a pallet clamp (according to a fourth embodiment) in cross section.

FIG. 9 is a cross-sectional view of a pallet clamp 100D according to this embodiment. This pallet clamp 100D includes no key member 170, that is, a smaller number of components.

Specifically, each clamp receiver 110 has no keyway 112 in the abutted surface 111, and serrations 111a are formed over the entire area of the abutted surface 111. The serrations 111a extend in parallel to the shorter sides of the clamp receiver 110.

The clamp 130 has no support groove 133 in the abutting surface 132, and serrations 132a are formed over the entire area of the abutting surface 132. The serrations 132a of the clamp 130 extend in parallel to the shorter sides of the clamp 130. The clamp 130 has a pair of regulators 137 and 137 at diagonally opposite corners apart from each other in the direction along the alignment of the ridges and grooves of the serrations 132a.

Each regulator 137 is a wall-like projection extending along the edge of the abutting surface 132. These regulators 137 are configured to slightly tilt the clamp receiver 110 with respect to the clamp 130 when the clamp receiver 110 is attached, but not fastened, to the clamp 130. That is, as shown in FIG. 9, the width W5 of the clamp 130 excluding these regulators 137 and 137 is formed slightly smaller than the width W6 of the clamp receiver 110.

(Attachment of Pallet Clamp 100D)

In this pallet clamp 100D, the fastening bolt 151 inserted into the bolt hole 113 of the clamp receiver 110 is screwed into the fastening hole 134. As the press-fitting by the fastening bolt 151 progresses, the abutted surface 111 and the abutting surface 132 come into tight contact with each other. Accordingly, the clamp receiver 110 slightly tilted with respect to the clamp 130 becomes parallel. An end portion of the side surface of the clamp receiver 110 facing one of the regulators 137 presses the facing surface (i.e., the pressed surface 180) of the regulator 137. An end portion of the side surface of the clamp receiver 110 facing the other regulator 137 presses the facing surface (i.e., the counter pressed surface 181) of this regulator 137.

Accordingly, in the pallet clamp 100D as well, the clamp receiver 110 is positioned highly accurately and fixed firmly to the clamp 130 in both of the directions along the alignment and extension of the ridges and grooves of the serrations 111a. The pallet clamp 100D is significantly simple in structure and includes advantageously smaller number of components. The structures of the clamps 130, e.g., restrictors 137, may be provided for the clamp receiver 110, and vice versa.

Fifth Embodiment

Figure 10:
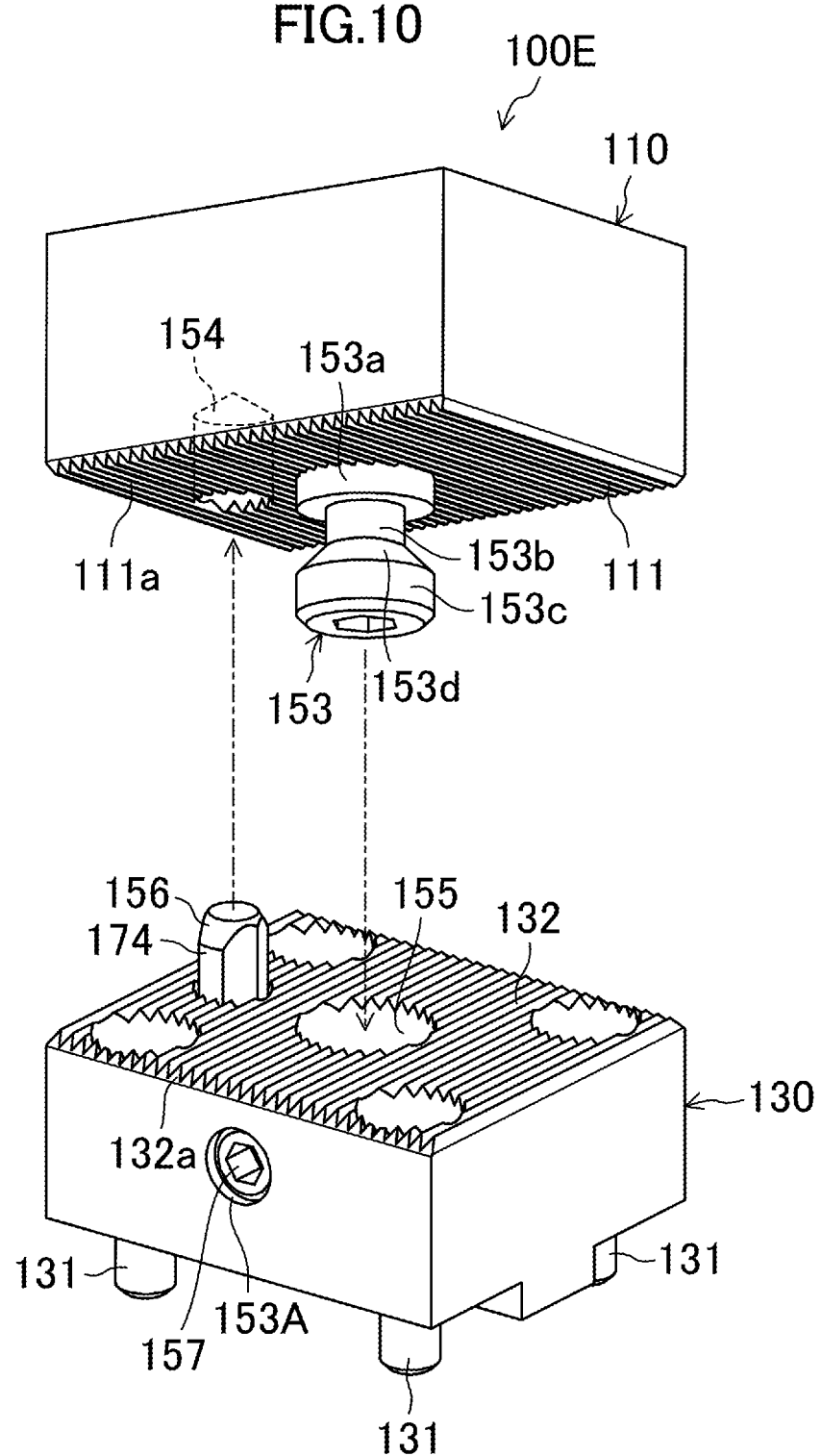
FIG. 10 is a diagram illustrating a schematic perspective view of a pallet clamp (according to a fifth embodiment).

FIG. 10 shows an overall structure of a pallet clamp 100E according to this embodiment. FIG. 11 is a cross-sectional view of a main part of the pallet clamp 100E. In this pallet clamp 100E, the biasing means 150 is incorporated into the pallet clamp 100E, which facilitates the automation.

Specifically, like in the fourth embodiment, the clamp receiver 110 has no keyway 112 in the abutted surface 111, and serrations 111a are formed over the entire area of the abutted surface 111. In this pallet clamp 100E, the serrations 111a of the clamp receiver 110 extend in parallel to the shorter sides of the clamp 130.

The abutted surface 111 is provided with a press-fitting shaft 153 and a pin hole 154. The press-fitting shaft 153 has a shaft base 153a fixed to the clamp receiver 110, a shaft body 153b having a smaller diameter and fixed to the shaft base 153a, and a shaft head 153c having a larger diameter and provided at the tip of the shaft body 153b. The press-fitting shaft 153 protrudes perpendicularly from a substantial center of the abutted surface 111. The shaft head 153c has, on the side closer to the shaft body 153b, an engagement surface 153d inclined conically.

The pin hole 154 is a round hole extending perpendicularly from the abutted surface 111. The pin hole 154 is apart from the press-fitting shaft 153 in the direction along the alignment of the ridges and grooves of the serrations 111a.

Like in the fourth embodiment, the clamp 130 has no support groove 133 in the abutting surface 132, and serrations 132a are formed over the entire area of the abutting surface 132. The serrations 132a of the clamp 130, too, extend in parallel to the shorter sides of the clamp 130. The abutting surface 132 has a shaft hole 155 and a regulation pin 156. The shaft hole 155 faces the press-fitting shaft 153 and receives the press-fitting shaft 153 inserted thereinto. The regulation pin 156 faces the pin hole 154 and is inserted in the pin hole 154.

The regulation pin 156 has a transverse section substantially in a diamond shape in the direction along the extension of each serration 132a. Slight gaps (i.e., fitting gaps) are left between the shaft hole 155 and the press-fitting shaft 153 (i.e., the shaft head 153c) and between the pin hole 154 and the regulation pin 156 (i.e., the side with a longer diameter).

The clamp 130 has a second transverse screw hole 153A passing from the side surface of the clamp 130 to the side surface of the shaft hole 155. A pull-in shaft 157 with a conical protruding end is screwed into the second transverse screw hole 153A. The protruding end of the pull-in shaft 157 protrudes into the shaft hole 155.

An end surface of the regulation pin 156 closer to the pull-in shaft 157 constitutes the acting portion 174 with a positioning function. More specifically, as shown in the frame defined by the two-dot chain line in FIG. 11, a distance W7 is set slightly longer than a distance W8. The distance W7 is from the end surface of the regulation pin 156 closer to the pull-in shaft 157 to the wall surface of the shaft hole 155 farther from the pull-in shaft 157 in the clamp 130. The distance W8 is from the wall surface of the pin hole 154 closer to the pull-in shaft 157 to the side surface of the shaft head 153c of the press-fitting shaft 153 farther from the pull-in shaft 157 in the clamp receiver 110.

In this pallet clamp 100E, the press-fitting shaft 153, the shaft hole 155, the pull-in shaft 157, and other parts constitute the biasing means 150.

(Attachment of Pallet Clamp 100E)

As shown in FIG. 10, in this pallet clamp 100E, the regulation pin 156 is inserted into the pin hole 154 and the press-fitting shaft 153 is inserted into the shaft hole 155 so that the abutting surface 132 and the abutted surface 111 come into contact with each other. In this state, the pull-in shaft 157 is screwed so that the protruding end thereof protrudes into the shaft hole 155. Accordingly, the protruding end of the pull-in shaft 157 is engaged with the engagement surface 153d. The slide function caused by the inclines of the pull-in shaft 157 and the engagement surface 153d draws the press-fitting shaft 153 into the shaft hole 155. As a result, the abutting surface 132 and the abutted surface 111 come into tight contact with each other.

At the same time, pressed by the pull-in shaft 157, the side surface of the shaft head 153c presses the wall surface (corresponding to the pressed surface 180) of the shaft hole 155 farther from the pull-in shaft 157. Accordingly, the clamp receiver 110 shifts along the direction of the extension of each serration 111a. However, the wall surface of the pin hole 154 comes into contact with the end surface (i.e., the acting portion 174) of the regulation pin 156 closer to the pull-in shaft 157, and the end surface of the regulation pin 156 presses the wall surface (corresponding to the counter pressed surface 181) of the pin hole 154 in the direction opposite to the pressing direction of the press-fitting shaft 153.

Accordingly, in these pallet clamps 100E as well, the clamp receiver 110 is positioned highly accurately and fixed firmly to the clamp 130 in both of the directions along the alignment and extension of the ridges and grooves of the serrations 111a. Since the biasing means 150 is incorporated into the pallet clamp 100E, a method other than bolt fastening can be used as a press-fitting means for the pallet clamp, which facilitates the automation.

Other Embodiments

The technology disclosed herein is not limited to the embodiments described above and includes other various configurations. For example, the shapes of the pallet clamps, including the clamps 130 and the clamp receivers 110, are mere examples. The shapes of these constituent members may be changed as appropriate in accordance with specifications. The embodiments described above illustrate the pallet clamps that clamp pallets manually. However, the structures of the fastening bolts 151 or the pull-in shafts 157 may be changed to automatic clamping.

At least one of the keyway or the support groove may be tilted. In short, there is only a need to cause the pressing function in the opposite directions through the tight contact of the serrations.

The biasing means is not limited to the bolt fastening. For example, the biasing means may be drawing in by driving a piston using fluid pressure, pressing by rotating a cam with a lever, biasing by elasticity of a spring, or pressing pallets from above in some way.

If there are a plurality of pallet clamps, e.g., four pallet clamps, not all the four pallet clamps but only one pallet clamp may have the biasing means. The four pallet clamps may not necessarily be provided with a biasing means, and another means that presses the vicinity of the center surrounded by four pallet clamps may be provided.

The pressed surfaces and the counter pressed surfaces described in the above embodiments may be combined as appropriate in accordance with specifications. For example, one of the two regulators 137 in FIG. 9 may be replaced with the pin hole 154 (or the press-fitting shaft 153) shown in FIG. 10.

DESCRIPTION OF REFERENCE CHARACTERS 100A to 100E Pallet Clamp
110 Clamp Receiver
111 Abutted Surface
111a Serrations
112 Keyway
130 Clamp
132 Abutting Surface
132a Serrations
133 Support Groove
150 Biasing Means
151 Fastening Bolt
170 Key Member
180 Pressed Surface
181 Counter Pressed Surface
201 Table
300 Pallet

The invention claimed is:

1. A pallet clamp for fixing a pallet to a table, with the pallet positioned on the table, the pallet clamp comprising:
   a clamp receiver on a back surface of the pallet;
   a clamp on a mounting surface of the table, the clamp facing the clamp receiver; and
   a press-fitted portion at which the clamp receiver and the clamp are press-fitted to each other in a direction perpendicular to the mounting surface by a biasing means;
   wherein:
   the clamp receiver has, at the press-fitted portion, an abutted surface having serrations;
   the clamp has, at the press-fitted portion, an abutting surface having serrations, the abutting surface coming into tight contact with the abutted surface;
   one of the clamp receiver or the clamp has both of a pressed surface and a counter pressed surface which face in directions along alignment and extension of ridges and grooves of the serrations, or one of the clamp receiver or the clamp has the pressed surface and the other has the counter pressed surface, and
   the biasing means press-fits the clamp receiver and the clamp to each other so that the abutting surface and the abutted surface come into tight contact with each other, which causes the pressed surface and the counter pressed surface to be pressed in opposite directions.

2. The pallet clamp of claim 1, further comprising:
   a key member interposed between the clamp receiver and the clamp, wherein:

the clamp receiver has a keyway in the abutted surface, the keyway traversing the serrations, the clamp has a support groove in the abutting surface, the support groove traversing the serrations and facing the keyway, the key member includes a key to be fitted into the keyway, and a support to be fitted into the support groove, the support is fitted into the support groove to be in an unremovable state, and the key is fitted into the keyway with a gap interposed therebetween, and the abutting surface and the abutted surface that have come into tight contact with each other cause the key to press the pressed surface and the counter pressed surface.

3. The pallet clamp of claim 2, wherein:

the keyway tilts with respect to the key when the key is fitted to, but not press-fitted to, the keyway.

4. The pallet clamp of claim 3, wherein:

the key member includes two key members for use in the pallet clamp, and one of the key members presses the pressed surface, and the other of the key members presses the counter pressed surface.

5. The pallet clamp of claim 2, wherein:

the key member includes two key members for use in the pallet clamp, and one of the key members presses the pressed surface, and the other of the key members presses the counter pressed surface.

6. The pallet clamp of claim 1, wherein: one of the clamp receiver or the clamp includes a pair of regulators, the pair of regulators being spaced apart from each other in the direction along the alignment of the ridges and grooves of the serrations, and the abutting surface and the abutted surface that have come into tight contact with each other cause the clamp receiver and the clamp to tilt relatively, and the other of the clamp receiver or the clamp to press the pressed surface and the counter pressed surface.

7. The pallet clamp of claim 1, wherein:

one of the abutted surface or the abutting surface includes:

a press-fitting shaft having, on one side, an engagement surface that is inclined; and a pin hole positioned away from the press-fitting shaft, the other of the abutted surface or the abutting surface includes:

a shaft hole configured to face the press-fitting shaft; and a regulation pin configured to face the pin hole, the shaft hole is configured to allow a pull-in shaft to protrude laterally into the shaft hole, the pull-in shaft having a protruding end to be engaged with the engagement surface, and the pull-in shaft is caused to protrude into the shaft hole, with the regulation pin inserted in the pin hole, the press-fitting shaft inserted in the shaft hole, and the abutting surface and the abutted surface in contact with each other, and the pull-in shaft protruding into the shaft hole draws the press-fitting shaft into the shaft hole and causes the abutting surface and the abutted surface to come into tight contact with each other, and causes the press-fitting shaft to press a wall surface of the shaft hole and the regulation pin to press a wall surface of the pin hole in a direction opposite to a direction in which the press-fitting shaft presses the wall surface of the shaft hole.

* * * * *